United States Patent Office
2,776,299
Patented Jan. 1, 1957

2,776,299

QUATERNARY AMMONIUM SALTS OF DIALKYL-AMINOALKYL ESTERS OF THIAXANTHENE-10-CARBOXYLIC ACID

John W. Cusic, Skokie, and Richard A. Robinson, Morton Grove, Ill., assignors, by mesne assignments, to G. D. Searle & Co., Skokie, Ill., a corporation of Delaware No Drawing. Application July 2, 1954,
Serial No. 441,177

2 Claims. (Cl. 260—328)

This invention relates to quaternary ammonium salts of dialkylaminoalkyl esters of thiaxanthene-10-carboxylic acid and to the production thereof. In particular this invention relates to quaternary ammonium salts of the following general structural formula

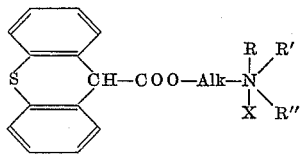

wherein Alk is a lower alkylene radical, X is one stoichiometric equivalent of an anion, and R, R' and R" are lower alkyl radicals.

This application is a continuation-in-part of our copending application Serial No. 286,612, filed May 7, 1952, now abandoned.

In the compounds of the type disclosed above Alk represents a lower alkylene radical containing at least two carbon atoms and not more than five carbon atoms. It is a bivalent, saturated, aliphatic radical such as the ethylene, trimethylene, propylene, or butylene radical. X represents a monovalent anion such as chloride, bromide, iodide, methyl sulfate, ethyl sulfate, benzene-sulfonate, nitrate, acetate and the like, as well as one stoichiometric equivalent of a monovalent anion such as sulfate, phosphate, citrate, succinate, tartrate, and the like. Such anions are non-toxic in therapeutic dosage. R, R', and R" represent such lower alkyl radicals as methyl, ethyl, propyl, isopropyl, butyl, and secondary-butyl.

The compounds of this invention are prepared by reacting a dialkylaminoalkyl ester of the formula

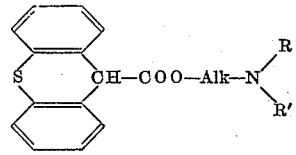

with an alkyl ester of a strong organic or inorganic acid of the formula

R"—Z wherein all symbols have the meanings given hereinabove and Z represents halogene, alkyl sulfate, or arylsulfonate radicals. These reactions are preferably carried out at elevated temperatures in the range of 50–150° centigrade in inert solvents such as acetone, methyl ethyl ketone, lower alcohols, chloroform, and nitromethane. However, lower temperatures from 0° to 50° C. are also satisfactory. Generally these reactions are preferably carried out in a closed system if a lower alkyl halide is used as one of the reagents. In most instances the crystalline quaternary salt precipitates from the chilled reaction mixture and may be isolated by filtration and dried. In certain instances it is necessary to precipitate the salt by the addition of a solvent, such as ether or a low boiling aliphatic or aromatic hydrocarbon in order to lower the solubility of the salt in the selected solvent. The anion Z, when it represents halogen, alkyl sulfate or arylsulfonate radicals, may be replaced by one equivalent of another anion of the type disclosed above, by reaction with a heavy metal salt, such as silver acetate, silver citrate, silver tartrate, silver benzoate, lead acetate, lead benzoate, silver malate, silver nitrate and the like.

The compounds of this invention are generally soluble in water or aqueous solutions of acohols and other water-soluble organic solvents. They exhibit surface-active properties and certain of them are useful as antiseptics and dispersing agents. They are also of value as medicinal agents, having sympatholytic properties. The compounds of this invention are anticholinergic drugs, and have the property of blocking or inhibiting the transmission of nervous impulses across ganglia.

Our invention is disclosed in detail by the following examples which are representative of methods of preparing the compounds within the scope of this invention, but which are not to be construed as limiting the invention in spirit or scope. Relative amounts of materials are given in parts by weight, temperatures are given in degrees centigrade (° C.) and pressures in millimeters (mm.) of mercury. The organic acids in this application are named and numbered according to "The Ring Index," by Patterson and Capell, Reinhold Publishing Co., New York, N. Y., 1940.

Example 1

A solution of 150 parts of thiaxanthene-10-carboxylic acid and 75 parts of γ-dimethylaminopropyl chloride in 1200 parts of absolute isopropyl alcohol is refluxed for two hours and then allowed to stand overnight. The reaction mixture is evaporated to dryness and the residue is dissolved in 1000 parts of water, washed with ether, and made alkaline with saturated sodium carbonate solution. The alkaline solution is extracted with ether and the ether extract is washed with water, dried with sodium sulfate, and filtered. The filtrate is evaporated to dryness and the residue is dissolved in 800 parts of anhydrous methyl ethyl ketone. Gaseous methyl chloride is bubbled through the resulting solution until 40 parts are taken up. The solution is allowed to stand until the crystalline precipitate of γ-dimethylaminopropyl thiaxanthene-10-carboxylate methochloride precipitates out. This material is collected on a filter, washed well with methyl ethyl ketone and dried. It has the formula

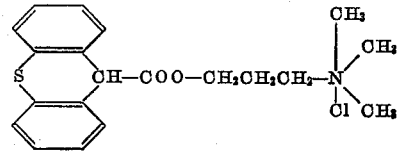

Example 2

50 parts of β-diethylaminoethyl thiaxanthene-10-carboxylate hydrochloride are dissolved in the minimum amount of water, treated with an excess of concentrated sodium carbonate solution and the resulting base is extracted with ether. The ether extract is washed with water, dried with anhydrous sodium sulfate, filtered and evaporated. 34 parts of the residue of β-diethyl-aminoethyl thiaxanthene-10-carboxylate thus obtained are dissolved in 125 parts of methyl ethyl ketone. 14.5 parts of methyl bromide gas are passed into the chilled solution. There is a slight evolution of heat, indicating reaction. On standing at room temperature crystals form rapidly. The crystalline precipitate of β-diethyl-aminoethyl thiaxanthene-10-carboxylate methobromide is collected, washed with ether and dried. The salt is readily soluble in water and alcohol. After recrystallization from mixtures of isopropanol and butanone, and isopropanol and ethanol, it melts at 208–209° C.

Example 3

A solution of 15 parts of β-diethylaminoethyl xanthene-9-carboxylate and 10 parts of ethylene bromohydrin in 60 parts of butanone are refluxed for 15 hours. On cooling a heavy precipitate of β-(β-hydroxyethylethylamino)-ethyl xanthene-9-carboxylate ethobromide forms. This is recrystallized from a mixture of isopropanol and butanone, and melts at about 149° C. It has the formula

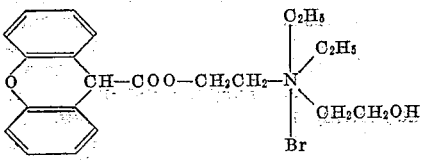

Example 4

325 parts of β-diethylaminoethyl xanthene-9-carboxylate and 171 parts of benzyl bromide are dissolved in 1250 parts of butanone and the resulting solution is refluxed for an hour. Crystals of the quaternary salt begin to separate during the reaction and on chilling the mixture becomes a slurry. The salt is collected on a filter, washed with cold butanone and with ether, and dried in a vacuum desiccator. A sample of β-diethylaminoethyl xanthene-9-carboxylate benzyl bromide on analysis showed 15.91% bromine; the calculated value is 16.08%.

Example 5

A. 15 parts of xanthone in 135 parts of thiophene-free, dry benzene and 120 parts of dry ether containing in suspension 6 parts of powdered sodium are agitated vigorously for 50 hours and then poured onto an excess of solid carbon dioxide. After the carbon dioxide is gone, the resulting solution is extracted with dilute sodium carbonate solution. The resulting solution is warmed with decolorizing charcoal, cooled, filtered, and acidified. The 9-hydroxyxanthene-9-carboxylic acid is collected on a filter and dried. It melts at 129–131° C.

B. 6 parts of 9-hydroxyxanthene-9-carboxylic acid and 6 parts of β-diethylaminoethyl chloride in 80 parts of isopropanol are heated to reflux for 2 hours and then left at room temperature for 15 hours. The solvent is removed under vacuum at 100° C. The residue of β-diethylaminoethyl 9-hydroxyxanthene-9-carboxylate hydrochloride is dissolved in water. The solution is made alkaline and extracted with ether. The ether extract is dried and evaporated. The residue of β-diethylaminoethyl 9-hydroxyxanthene-9-carboxylate is dissolved in dry ether, treated with decolorizing charcoal, filtered and treated with an excess of hydrogen chloride in absolute alcohol. The oily precipitate of the hydrochloride is removed and dried in vacuum. It is taken up in hot absolute ethanol and allowed to evaporate slowly in a desiccator. There is thus obtained an amorphous residue of β-diethylaminoethyl 9-hydroxyxanthene-9-carboxylate hydrochloride. A sample on analysis showed 9.80% chlorine; the calculated value is 9.40%.

C. 3 parts of β-diethylaminoethyl 9-hydroxyxanthene-9-carboxylate and 2 parts of methyl bromide in 15 parts of methyl ethyl ketone are heated in a closed vessel for 15 hours at 90–100° C. The oily precipitate of the quaternary salt is separated and dried in vacuum. It is triturated with dry ether, washed and dried in vacuum. It forms an amorphous powder without a definite melting point. A sample of the methobromide of β-diethylaminoethyl 9-hydroxyxanthene-9-carboxylate showed on analysis 18.68% of bromine; the calculated value is 18.40%.

Example 6

A solution of 270 parts of 9-methylxanthene in 650 parts of dry benzene is added to a solution of butyllithium prepared from 411 parts of n-butyl bromide and 42 parts of lithium in 3000 parts of dry ether. The solution is refluxed for three hours, then poured onto an excess of solid carbon dioxide. The mixture is extracted with water and the extract is acidified. The precipitate of 9-methylxanthene-9-carboxylic acid is collected on a filter, washed thoroughly with water and dried.

A solution of 46 parts of 9-methylxanthene-9-carboxylic acid and 30 parts of β-diethylaminoethyl chloride in 85 parts of isopropanol is refluxed for 4 hours. The solution is chilled and diluted with dry ether. On standing at low temperature a crystalline precipitate of β-diethylaminoethyl 9-methylxanthene-9-carboxylate hydrochloride forms. This is collected on a filter, washed with ether and dried. It is dissolved in a minimum of warm water and treated with an excess of concentrated sodium carbonate solution. The free base, β-diethylaminoethyl 9-methylxanthene-9-carboxylate, is extracted with ether and the extract is washed with water, dried and evaporated.

35 parts of β-diethylaminoethyl 9-methylxanthene-9-carboxylate are dissolved in 150 parts of chloroform and gaseous methyl bromide is passed into the chilled solution until 15 parts are absorbed. The solution is then heated in a closed vessel at 70° C. for 5 hours. The reaction mixture is chilled and diluted with dry ether. The precipitate of β-diethylaminoethyl 9-methylxanthene-9-carboxylate methobromide is removed and washed with ether. A sample on analysis showed 18.2% bromine; the calculated value is 18.4%.

Example 7

An agitated solution of 165 parts of di-p-bromophenyl ether and 250 parts of oxalyl chloride in 950 parts of carbon disulfide is chilled in ice and treated with 100 parts of anhydrous aluminum chloride over a period of ½ hour, the temperature being maintained below 5° C. The mixture is stirred for 1½ hours at ice temperature, then treated with 80 parts of anhydrous aluminum chloride and agitated for 4 hours longer at low temperature. The reaction mixture is left at room temperature for 16 hours. It is decomposed with ice and dilute muriatic acid. The organic layer is separated, washed with water and dried. On evaporation there is obtained a residue of 2,7-dibromoxanthone.

A mixture of 9 parts of red phosphorus and 6 parts of iodine in 100 parts of propionic acid is agitated and a solution of 50 parts of 2,7-dibromoxanthone in 100 parts of propionic acid is added. The mixture is warmed and agitated and then 8 parts of water are added slowly. The mixture is agitated and refluxed for 46 hours, then poured into 750 parts of ice water. The precipitate is removed, washed with water, dried and dissolved in chloroform. The chloroform solution is filtered and evaporated, leaving a residue of 2,7-dibromoxanthene.

In 100 parts of diethylene glycol diethyl ether are dissolved 10.5 parts of naphthalene and 4.6 parts of 50% sodium-naphthalene powder. The solution is chilled to −35° C. and placed in a nitrogen atmosphere. To the stirred solution 17 parts of 2,7-dibromoxanthene are added in portions, the temperature being maintained at −30° C. to −35° C. The mixture is stirred and allowed to warm to room temperature. It is then poured on an excess of solid carbon dioxide in 150 parts of toluene. After the carbon dioxide is consumed water is added and the aqueous layer is separated and acidified. A precipitate of 2,7-dibromoxanthene-9-carboxylic acid forms. This is collected on a filter, washed with water and dried.

A solution of 12.3 parts of 2,7-dibromoxanthene-9-carboxylic acid and 4.6 parts of β-diethylaminoethyl chloride in 65 parts of isopropanol is refluxed 3 hours. The solvent is removed by evaporation and the residue of β-diethylaminoethyl 2,7-dibromoxanthene-9-carboxylate hydrochloride is dissolved in water. The solution is made alkaline with concentrated sodium hydroxide solution and the basic ester is extracted with ether. The ether solution is washed with water, dried and evaporated. There is thus obtained β-diethylaminoethyl 2,7-dibromoxanthene-9-carboxylate as a light colored viscous oil. It is taken up in 100 parts of butanone and 20 parts of methyl bromide are added. The solution is heated in a closed vessel at 65° C. for two days. The solvent is then evaporated to about ⅓ volume and dry ether is added. A precipitate of β-diethylaminoethyl 2,7-dibromoxanthene-9-carboxylate methobromide is formed. This is removed, washed with ether and dried. A sample on analysis showed 41.16% bromine; the calculated value is 41.47%. The salt has the formula

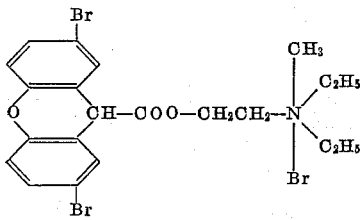

*Example 8*

A solution of 115 parts of di-p-methoxyphenyl ether and 250 parts of oxalyl chloride in 1000 parts of carbon disulfide is chilled to 0° C. Then 100 parts of anhydrous aluminum chloride are added slowly with good agitation, the temperature being maintained below 5° C. The reaction mixture is agitated for 2 hours at 0–5° C., then 50 parts of anhydrous aluminum chloride are added and agitation is continued at low temperature for 3 hours. The mixture is left at room temperature and then decomposed with ice and muriatic acid. The carbon disulfide layer is washed with water and evaporated. The residue of 2,7-dimethoxyxanthone is digested with hot 10% sodium carbonate solution, filtered, washed with water and dried.

A solution of 40 parts of 2,7-dimethoxyxanthone in 800 parts of ethanol is treated with 80 parts metallic sodium at such a rate that gentle refluxing is maintained. The solution is refluxed for 2 hours longer and poured into 4000 parts of ice and water. The precipitate of 2,7-dimethoxyxanthene is removed and dried.

Sodium-naphthalene solution in diethylene glycol diethyl ether is produced as in Example 7 from 9 parts of 50% sodium-naphthalene powder and 21 parts of naphthalene in 200 parts of diethylene glycol diethyl ether. The solution is placed in a nitrogen atmosphere and chilled to —30° C. 12 parts of 2,7-dimethoxyxanthene are added in portions with good agitation, the temperature being kept below —25° C. The reaction mixture is allowed to come to room temperature and is then poured on an excess of solid carbon dioxide in 140 parts of toluene. When the carbon dioxide is gone, water is added and the organic layer is separated. The aqueous layer is acidified and the precipitate of 2,7-dimethoxyxanthene-9-carboxylic acid is collected on a filter, washed with water and dried.

28 parts of 2,7-dimethoxyxanthene-9-carboxylic acid and 15 parts of β-diethylaminoethyl chloride are dissolved in 200 parts of isopropanol and refluxed for 3 hours. The solution is evaporated and the residue of β-diethylaminoethyl 2,7-dimethoxyxanthene-9-carboxylate hydrochloride is dissolved in water and treated with an excess of concentrated potassium carbonate solution. The basic ester is extracted with ether and the ether extract is dried and evaporated. 10 parts of β-diethylaminoethyl 2,7-dimethoxyxanthene-9-carboxylate are dissolved in 40 parts of butanone and treated with 20 parts of methyl bromide. The resulting solution is heated in a closed vessel at 60–70° C. for 16 hours. The chilled solution is diluted with dry ether and the precipitate of β-diethylaminoethyl 2,7-dimethoxyxanthene-9-carboxylate methobromide is collected on a filter, washed with ether and dried. A sample on analysis showed 16.38% bromine; the calculated value is 16.64%. This salt has the formula

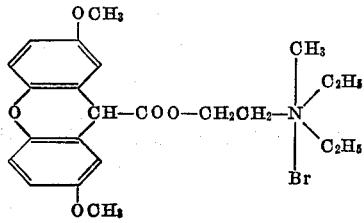

*Example 9*

260 parts of xanthene-9-carboxylic acid chloride and 141 parts of β-diallylaminoethanol are dissolved in 1600 parts of butanone. A slight exothermic reaction takes place upon mixing. The solution is then refluxed for 5 hours and evaporated to remove most of the solvent. On standing at low temperature a heavy precipitate of β-diallylaminoethyl xanthene-9-carboxylate hydrochloride forms. This salt is collected on a filter, washed with cold butanone and dried. It melts at 147–148° C. This salt is dissolved in water and treated with a concentrated solution of potassium carbonate. The free base is extracted with ether and the ether solution is dried and evaporated. 22 parts of β-diallylaminoethyl xanthene-9-carboxylate thus obtained are dissolved in 75 parts of chloroform and treated with 26 parts of methyl bromide. The resulting solution is heated at 80° C. in a closed vessel for 17 hours. The reaction mixture is chilled and diluted with anhydrous ether. An oily precipitate forms that soon solidifies. This precipitate is removed and recrystallized from isopropanol. β-Diallylaminoethyl xanthene-9-carboxylate methobromide thus obtained melts at 134–135° C.

*Example 10*

15 parts of β-diethylaminoethyl thiaxanthene-10-carboxylate and 20 parts of crotyl bromide in 85 parts of butanone are reacted at 50° C. for 15 hours. The solvent is then removed by evaporation and the residue of β-crotylethylaminoethyl thiaxanthene-10-carboxylate ethobromide is triturated in cold acetone. There is thus obtained in solid form the quaternary salt of the formula

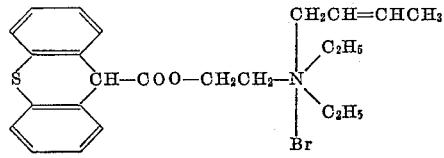

A sample on analysis showed 16.59% bromine; the calculated value is 16.78%.

*Example 11*

25 parts of δ-dimethylaminobutyl xanthene-9-carboxylate and 15 parts of phenethyl bromide in 80 parts of butanone are refluxed for 17 hours. The solvent is then removed under vacuum and the residue of the quaternary ammonium salt is triturated with dry ether. A sample of the salt on analysis showed 15.62% bromine; the calculated value is 15.66. The salt has the formula

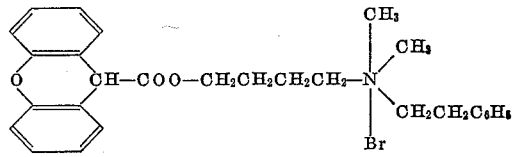

*Example 12*

220 parts of 2,7-dimethylxanthone are dissolved in 4000 parts of hot alcohol and 400 parts of metallic sodium are added to the refluxing solution over a period of about 2 hours. The solution is then poured into 20,000 parts of ice water and the precipitate of 2,7-dimethylxanthene is collected on a filter, washed with water, and dried. After recrystallization from a mixture of dioxane and water, this product melts at 164–166° C.

A solution of sodium-naphthalene in diethylene glycol diethyl ether is prepared as in Example 7 from 46 parts of 50% sodium-naphthalene powder, 105 parts of naphthalene, and 1000 parts of diethylene glycol diethyl ether. The solution is chilled under an atmosphere of nitrogen to −25° C. and 105 parts of 2,7-dimethylxanthene are added with good agitation. The reaction mixture is allowed to come to room temperature, and it is then poured on an excess of solid carbon dioxide in 750 parts of toluene. After the carbon dioxide is consumed, water is added, and the aqueous layer is separated and acidified. The precipitate of 2,7-dimethylxanthene-9-carboxylic acid is collected on a filter, washed with water, and dried. This acid melts at 226–230° C. with decomposition.

A solution of 82 parts of 2,7-dimethylxanthene-9-carboxylic acid and 46 parts of β-diethylaminoethyl chloride in 500 parts of isopropanol is refluxed for 3 hours. The solvent is then removed under vacuum and the residue of β-diethylaminoethyl 2,7-dimethylxanthene-9-carboxylate hydrochloride is taken up in water containing a small amount of dilute hydrochloric acid. The aqueous solution is washed twice with ether, then made alkaline with caustic soda solution, and extracted twice with ether to remove the basic ester thus liberated. The ether extract is washed with water, dried and evaporated, leaving a residue of β-diethylaminoethyl 2,7-dimethylxanthene-9-carboxylate as a light colored viscous oil. This basic ester, when dissolved in dry ether and treated with an equivalent of hydrogen chloride in absolute isopropanol, forms a crystalline hydrochloride which melts at 142–143° C., after recrystallization from a mixture of ethyl acetate and petroleum ether.

50 parts of β-diethylaminoethyl 2,7-dimethylxanthene-9-carboxylate are dissolved in 1000 parts of butanone. The solution is chilled and treated with gaseous methyl bromide until about 100 parts are taken up. This solution is left at room temperature for 48 hours and then evaporated to about ⅕ its volume. A crystalline precipitate of β-diethylaminoethyl 2,7-dimethylxanthene-9-carboxylate methobromide precipitates. This is separated and recrystallized from a mixture of isopropanol and ethyl acetate. It forms colorless crystals melting at 151.5–153° C. It has the structural formula

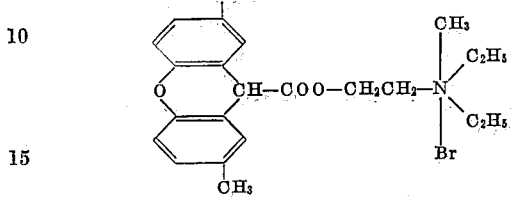

We claim:
1. A quarternary ammonium salt of a dialkylaminoalkyl ester of thiaxanthene-10-carboxylic acid, having the formula

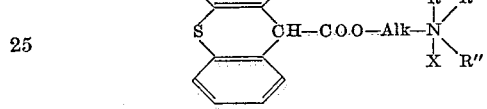

wherein Alk is a lower alkylene radical, R, R' and R" are lower alkyl radicals and X is a non-toxic anion.

2. β-Diethylaminoethyl thiaxanthene-10-carboxylate methobromide, having the formula

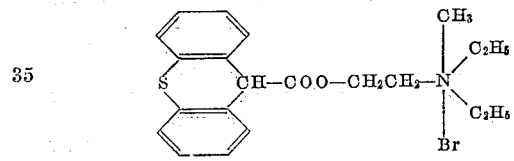

References Cited in the file of this patent
UNITED STATES PATENTS
2,659,732    Cusic et al. _____ Nov. 17, 1953